(12) United States Patent
Shimamoto et al.

(10) Patent No.: US 11,615,278 B2
(45) Date of Patent: Mar. 28, 2023

(54) IMAGE PROCESSING APPARATUS, IMAGE FORMING APPARATUS, AND IMAGE PROCESSING METHOD THAT PERFORMS ANALYSIS IMAGE PROCESSING DURING NORMAL IMAGE PROCESSING

(71) Applicant: KYOCERA Document Solutions Inc., Osaka (JP)

(72) Inventors: Kunihiko Shimamoto, Torrance, CA (US); Norifumi Miyahara, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 78 days.

(21) Appl. No.: 17/163,512

(22) Filed: Jan. 31, 2021

(65) Prior Publication Data
US 2022/0245413 A1     Aug. 4, 2022

(51) Int. Cl.
   *G06K 15/02* (2006.01)
   *G06K 9/00* (2022.01)
   *G06V 30/40* (2022.01)
   *G06V 30/10* (2022.01)

(52) U.S. Cl.
   CPC ....... *G06K 15/188* (2013.01); *G06K 15/1822* (2013.01); *G06K 15/1889* (2013.01); *G06K 15/1894* (2013.01); *G06V 30/40* (2022.01); *G06V 30/10* (2022.01)

(58) Field of Classification Search
   None
   See application file for complete search history.

(56) References Cited

U.S. PATENT DOCUMENTS

| | | | |
|---|---|---|---|
| 5,920,685 A * | 7/1999 | Romano | H04N 1/3871 358/1.15 |
| 2012/0062914 A1* | 3/2012 | Iwamoto | H04N 1/62 358/1.9 |
| 2015/0243010 A1* | 8/2015 | Kaneko | G06T 7/001 382/112 |

* cited by examiner

*Primary Examiner* — Andrew H Lam
(74) *Attorney, Agent, or Firm* — Hawaii Patent Services; Nathaniel K. Fedde; Kenton N. Fedde

(57) ABSTRACT

Provided is an image processing apparatus that improves the performance when performing image processing accompanying an analysis. An image acquisition unit acquires processing image data for performing processing. A normal image processing unit performs normal image processing for normal output on the processing image data acquired by the image acquisition unit and outputs the normal image data. An analysis image processing unit performs analysis image processing accompanied by analysis in parallel with the normal image processing by the normal image processing unit and outputs the analysis image data. A merge processing unit merges the normal image data output by the normal image processing unit and the analysis image data output by the analysis image processing unit and outputs print data for printing.

16 Claims, 4 Drawing Sheets

IMAGE PROCESSING APPARATUS, IMAGE FORMING APPARATUS, AND IMAGE PROCESSING METHOD THAT PERFORMS ANALYSIS IMAGE PROCESSING DURING NORMAL IMAGE PROCESSING

BACKGROUND

The present disclosure relates to an image processing apparatus, an image forming apparatus, and an image processing method, and more particularly to an image processing apparatus, an image forming apparatus, and an image processing method for performing image processing for output by printing or the like.

Typically, there is an image forming apparatus such as multifunctional peripherals (MFPs) capable of printing documents and images.

The image forming apparatus also functions as an image processing apparatus that performs imaging process for printing such as image-processing color image data read from a document and outputting a monochrome image, or the like.

As a typical image forming apparatus, there is an image processing apparatus including a hue designation means, a pixel extraction means, and a luminance data conversion means. In this apparatus, the hue designation means generates hue designation information for designating the hue to be converted based on the user's operation. The pixel extraction means extracts pixels of the hue specified by the hue designation information from the color image based on the hue obtained from the chromaticity data. The luminance data conversion means lowers the upper limit of the luminance with respect to the luminance data of the pixels extracted by the pixel extraction means. Then, the luminance data conversion means performs a process of converting the luminance value by using a function that monotonically increases within a predetermined range including the upper limit value and generates a monochrome image from the color image.

In this way, in a typical image forming apparatus, when a color image read from a document is printed in monochrome, an area represented in a specific color can be emphasized.

SUMMARY

An image processing apparatus of the present disclosure includes an image acquisition unit configured to acquire processing image data for image-processing; a normal image processing unit configured to perform normal image processing for normal output on the processing image data acquired by the image acquisition unit and to output normal image data; an analysis image processing unit configured to perform analysis image processing accompanied by analysis and to output analysis image data in parallel with the normal image processing performed by the normal image processing unit; and a merge processing unit configured to merge the normal image data output by the normal image processing unit and the analysis image data output by the analysis image processing unit and to output print data for printing.

An image forming apparatus of the present disclosure includes an image acquisition unit configured to acquire processing image data for image-processing; a normal image processing unit configured to perform normal image processing for normal output on the processing image data acquired by the image acquisition unit and to output normal image data; an analysis image processing unit configured to perform analysis image processing accompanied by analysis and to output analysis image data in parallel with the normal image processing performed by the normal image processing unit; a merge processing unit configured to merge the normal image data output by the normal image processing unit and the analysis image data output by the analysis image processing unit and to output print data for printing; and an image forming unit configured to form an image of the print data that has been merged by the merge processing unit.

An image processing method of the present disclosure is executed by an image processing apparatus, including the steps of: acquiring processing image data for image-processing; performing normal image processing for normal output on the processing image data that is acquired and outputting normal image data; performing analysis image processing accompanied by analysis and outputting analysis image data in parallel with the normal image processing; and merging the output normal image data and the output analysis image data and outputting print data for printing.

DETAILED DESCRIPTION

<Embodiment>

[System configuration of image forming apparatus 1]

Figure 1:
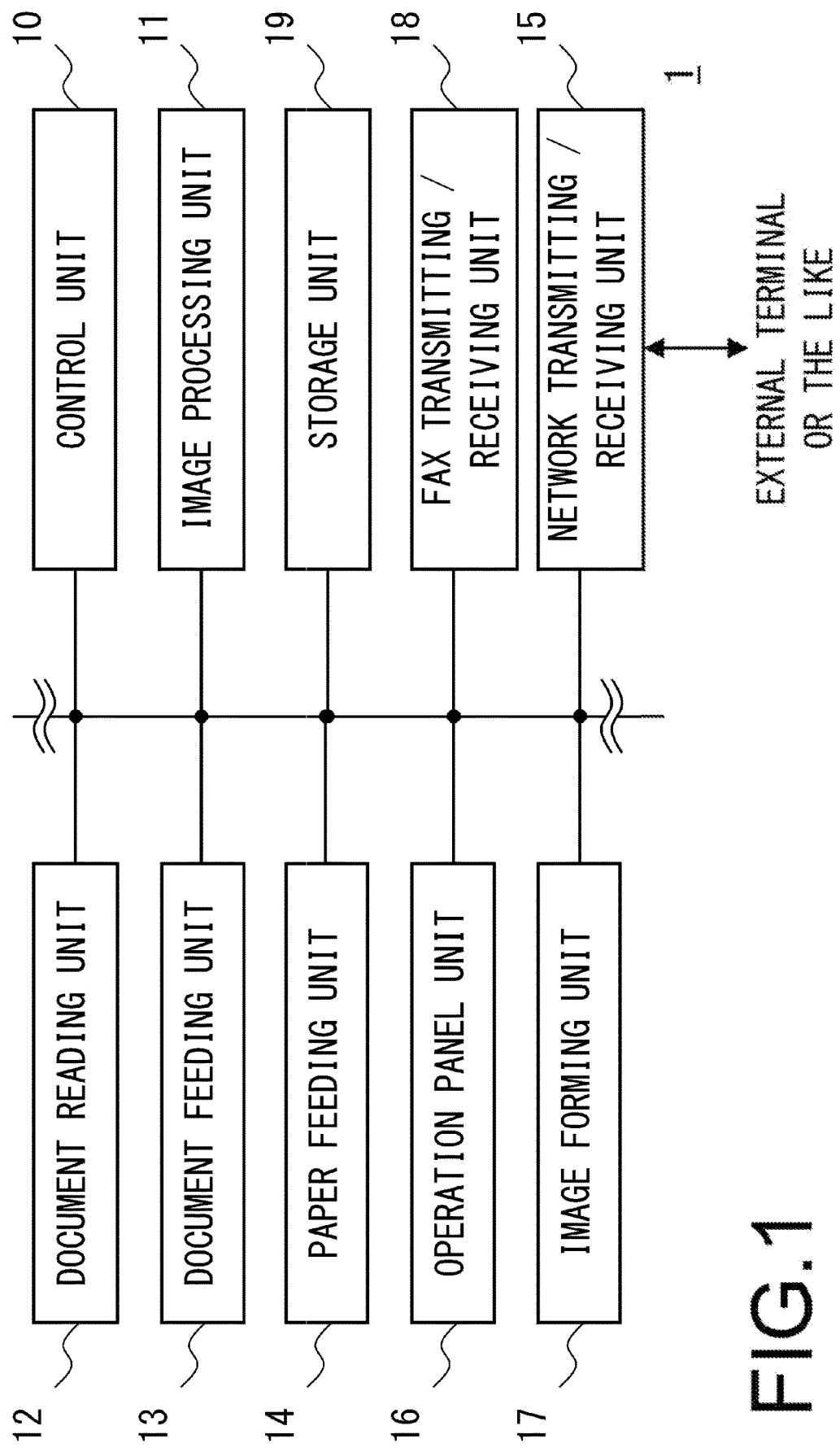
FIG. 1 is a system block diagram of the image forming apparatus according to an embodiment of the present disclosure.

First, the system configuration of the image forming apparatus 1 is described with reference to FIG. 1.

The image forming apparatus 1 includes a control unit 10, an image processing unit 11, a document reading unit 12, a document feeding unit 13, a paper feeding unit 14, a network transmitting/receiving unit 15, an operation panel unit 16, an image forming unit 17, a fax transmitting/receiving unit 18, and a storage unit 19. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for specific applications), or the like.

The control unit 10 reads a control program stored in the ROM or HDD of the storage unit 19, expands the control program in the RAM, and executes the control program. As a result, the control unit 10 is operated as each unit of the functional block as described later. Further, the control unit 10 controls the entire apparatus according to an instruction information input from an external terminal or the operation panel unit 16.

The image processing unit 11 is a control calculation unit such as a DSP (Digital Signal Processor), a GPU (Graphics Processing Unit), an ASIC, or the like. The image processing unit 11 performs image processing for normal output on the image data. This image processing includes, for example, monochrome image processing for converting color image data into monochrome (single color, black and white). In addition to this, the image processing unit 11 may be capable of performing image processing such as scaling, rotation and distortion (skew) correction, density adjustment, gradation adjustment, and image improvement. The skew correction includes processing of a spread portion of a spread document such as a book. In addition, the image processing unit 11 may be capable of performing processing such as increasing the resolution of the image data or removing noise.

In the present embodiment, these image processing for normal output are hereinafter referred to as "normal image processing". In the present embodiment, the image processing unit 11 performs the normal image processing on the high-resolution data 202 (FIG. 2) as described later and outputs the normal image data 210.

In addition, the image processing unit 11 can also perform various image processing accompanied by analysis. In the present embodiment, various image processes accompanied by the analysis include, for example, color character enhancement at the time of monochrome output, optical character recognition (hereinafter referred to as "OCR"), keyword extraction, and various kinds of image recognition.

Image processing that involves these analyzes is hereinafter referred to as "analysis image processing" in the present embodiment.

In the present embodiment, the image processing unit 11 may also have a function of an accelerator of OCR or AI (Artificial Intelligence) for executing the analysis processing according to the analysis image processing. Specifically, the image processing unit 11 can use the trained model of the convolutional neural network or train the model itself. In this embodiment, various models that perform geometric layout analysis of an image, recognize an area of a document, and recognize characters, tables, and images can be used. Of these, for characters, performing character recognition by AI, acquiring characters and positions of the characters on the image data, and performing keyword extraction are possible. For images, a model that recognizes a non-text line, a symbol, an illustration, a logo, a photograph, and the like can also be used. Of these, for photographs, a model that recognizes an imaged object such as a person, an animal, an object, or the like, can be used.

In the present embodiment, in these cases, the image processing unit 11 analyzes the low-resolution data 201 (FIG. 2) and outputs the processing result as the analysis image data 220.

In addition, the image processing unit 11 includes hardware such as an ASIC, or the like, that performs image processing such as stamping, form insertion, page number addition, overlay, or the like. Of these, the stamp is a process of adding the set image data at the time of output. In the present embodiment, the stamp includes a process of adding an electronic stamp or a watermark. The form insertion includes processing such as variable printing, or the like, that adds set characters and images to the set form data. The page number addition is a process of adding the number of output pages to a margin, an edge of a page, or the like, at the time of output. The overlay process is a process of averaging two image data, performing other image processing, superimposing them, or the like. By using this overlay process, the above-mentioned stamp and form insertion and page number addition processes can also be performed. Further, the merge process as described later can be performed by using this hardware.

In the present embodiment, these merge processes are performed on the normal image data 210 (FIG. 2) and the analysis image data 220, and the print data 230 is output.

Figure 2:
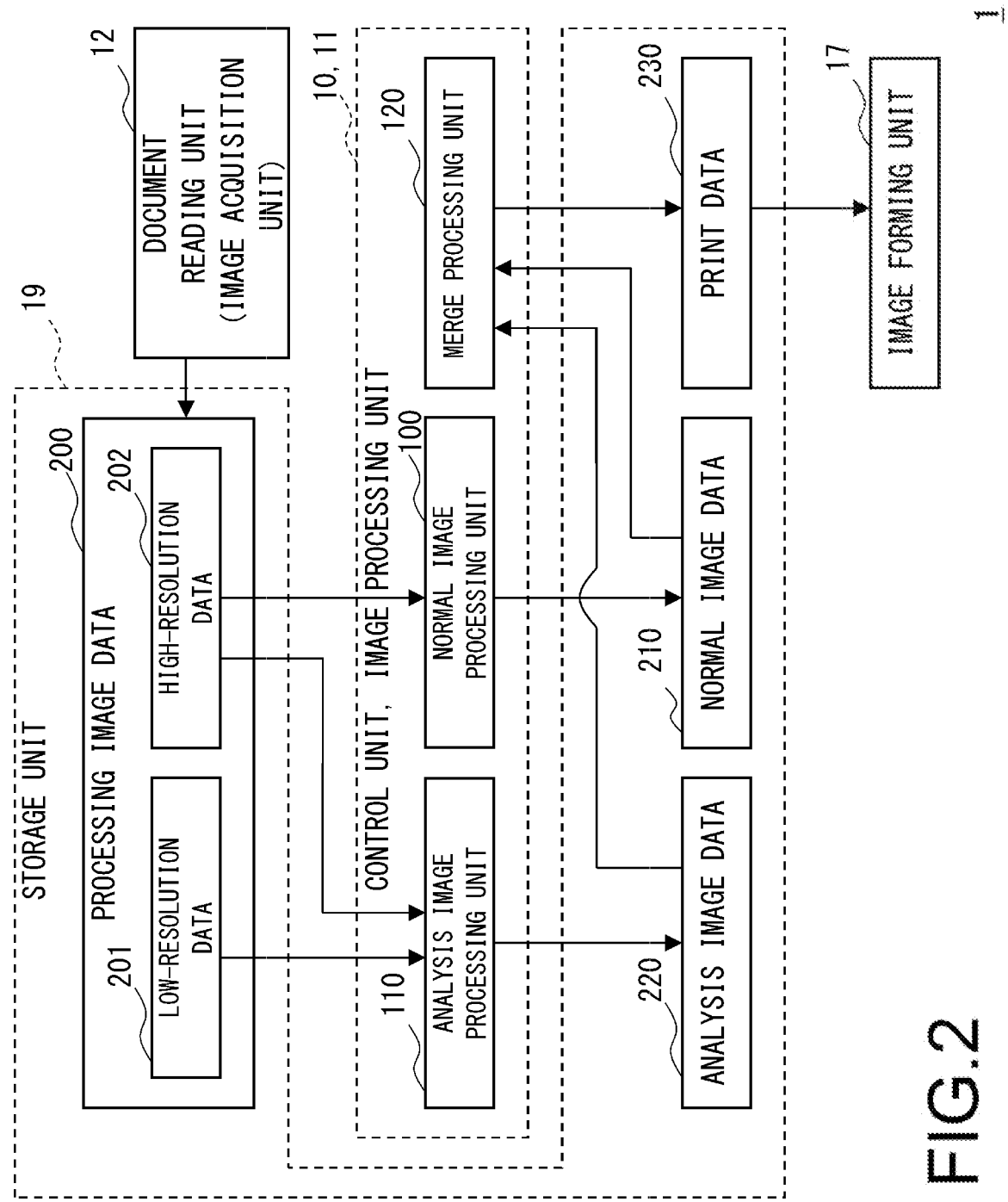
FIG. 2 is a block diagram showing a functional configuration of the image forming apparatus according to the embodiment of the present disclosure.

Further, the image processing unit 11 can also store the processed image data in the storage unit 19 as print data 230 (FIG. 2). At this time, the image processing unit 11 can also convert the print data 230 into a file of electronic document data such as PDF, or the like, or image data such as TIFF, or the like. The image processing unit 11 may also include an accelerator function for these conversions.

The document reading unit 12 reads the set document. Further, the document reading unit 12 is arranged above the main body of the image forming apparatus 1.

The document reading unit 12 includes a scanner, platen glass, and a document reading slit. When reading a document placed on the platen glass, the document reading unit 12 moves the scanner to a position facing the platen glass and reads with scanning the document placed on the platen glass to acquire image data. Then, the acquired image data is stored in the storage unit 19.

Further, the document reading unit 12 moves the scanner to a position facing the document reading slit when reading the document supplied from the document feeding unit 13. Then, the document reading unit 12 reads the document through the document reading slit in synchronization with the document transport operation by the document feeding unit 13 to acquire image data. The document reading unit 12 stores the acquired image data in the storage unit 19.

The image data read by the document reading unit 12 is the processing image data 200 (FIG. 2) according to the present embodiment.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document placing unit to the document reading unit 12 one by one in order by the document transporting mechanism.

The paper feeding unit 14 feeds the recording paper one by one toward the image forming unit 17. The paper feed unit 14 is provided in the main body unit.

The network transmitting/receiving unit 15 is a network connection unit including a LAN board, a wireless transmitter/receiver, and the like, for connecting to an external network. The external network according to the present embodiment is, for example, a LAN, a wireless LAN, a WAN, a mobile phone network, a voice telephone network, or the like.

The network transmitting/receiving unit 15 transmits/receives data on a data communication line, and transmits/receives a voice signal on a voice telephone line.

The operation panel unit 16 includes an input unit such as a button, a touch panel, or the like, and a display unit such as an LCD (Liquid Crystal Display), an organic EL display, or the like. Further, the operation panel unit 16 is arranged on the front side of the image forming apparatus 1.

The buttons of the input unit of the operation panel unit 16 are a numeric keypad, buttons for starting, cancelling, switching an operation mode, and giving an instruction according to job execution, or the like. The operation mode may include various kinds of modes such as copying, fax transmission, scanner, and network scanner. In addition, execution of jobs such as printing, sending, saving, and recording the selected document can be instructed. The input unit of the operation panel unit 16 acquires instructions for the various jobs of the image forming apparatus 1 by the user. Further, inputting and changing the information of each user according to the user's instruction acquired from the operation panel unit 16 is also possible.

The image forming unit 17 forms an image on the recording paper from the data stored in the storage unit 19, read by the document reading unit 12, or acquired from an external terminal according to the output instruction of the user.

The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

The FAX transmitting/receiving unit 18 transmits/receives a facsimile. The FAX transmitting/receiving unit 18 receives facsimile from another FAX apparatus via a voice line and stores it as the image data in the storage unit 19.

The image data may be image-processed as the processing image data 200 (FIG. 2) according to the present embodiment. In addition, the FAX transmitting/receiving unit 18 can form an image of the image-processed image data by the image-forming unit 17.

Furthermore, FAX transmitting/receiving unit 18 can also convert the document read by the document reading unit 12 and the network FAX data transmitted from the external terminal into the processing image data 200. Further, the FAX transmitting/receiving unit 18 can facsimile-transmit the print data 230 (FIG. 2) to another FAX apparatus by the voice line.

The storage unit 19 is a non-transitory recording medium such as a semiconductor memory of a ROM (Read Only Memory), a RAM (Random Access Memory), or the like, or an HDD (Hard Disk Drive), or the like.

Even in the power saving state, the RAM of the storage unit 19 may retain the stored contents by a function such as self-refreshing, or the like.

A control program for controlling the operation of the image forming apparatus 1 is stored in the ROM or HDD of the storage unit 19. In addition to this, the storage unit 19 also stores set values, threshold values, and the like, for various image processing. Further, the storage unit 19 also stores the user's account settings. Further, the storage unit 19 may include an area of a storage folder (document box) for each user or group.

In addition, in the image forming apparatus 1, the control unit 10 and the image processing unit 11 may be integrally-formed such as a GPU built-in CPU, a chip on module package, and an SOC (System On a Chip), or the like.

Further, the control unit 10 and the image processing unit 11 may include a built-in RAM, ROM, flash memory, or the like.

[Functional Configuration of Image Forming Apparatus 1]

Here, the functional configuration of the image forming apparatus 1 is described with reference to FIG. 2.

The control unit 10 and the image processing unit 11 of the image forming apparatus 1 include a normal image processing unit 100, an analysis image processing unit 110, and a merge processing unit 120.

The storage unit 19 stores the processing image data 200, the normal image data 210, the analysis image data 220, and the print data 230.

The normal image processing unit 100 performs normal image processing for normal output on the processing image data 200 acquired by the image acquisition unit and outputs the normal image data 210. Here, the normal image processing of the present embodiment includes monochrome image processing for converting color image data for monochrome printing. Alternatively, the normal image processing may include the above-mentioned various image processing executed by the image processing unit 11.

The analysis image processing unit 110 performs analysis image processing accompanied by analysis in parallel with the normal image processing by the normal image processing unit 100, and outputs the analysis image data 220. In the present embodiment, the analysis image processing unit 110 can perform analysis by using the low-resolution data 201 of the processing image data 200. The analysis includes OCR processing, keyword extraction, image recognition by AI, and the like, among processing of the analysis image processing. At this time, processing can be performed by using various accelerators in the image processing unit 11 as described above.

The merge processing unit 120 merges the normal image data 210 output by the normal image processing unit 100 and the analysis image data 220 output by the analysis image processing unit 110 and outputs print data 230 for printing. Specifically, as the merge process, when there is an area having a specific number of pixels ratio in the analysis image data 220, the merge processing unit 120 replaces the pixels in the area of the normal image data 210. In addition, the merge processing unit 120 can also perform the merge process by hardware that performs any of stamping, form insertion, page number addition, and overlay (hereinafter, referred to as "stamp and the like").

In the present embodiment, the document reading unit 12 functions as an image acquisition unit and acquires the processing image data 200.

The image forming unit 17 forms an image of the print data 230 merged by the merge processing unit 120.

The processing image data 200 is image data for performing the above-mentioned various image processing. In the present embodiment, the processing image data 200 is, for example, data of an image of a document placed on a document placing unit and read by the document reading unit 12 according to an instruction from the operation panel unit 16. In this case, as the processing image data 200, various image data of still images such as JPEG (JPG), TIFF, RAW bitmap, BMP, GIF, PNG, or the like, may be used. Alternatively, the processing image data 200 may be, for example, bitmap image data for each page in which data such as PDL (Page Description Language), PS (Post Script, registered trademark), or the like, which is rendered by the control unit 10. The data of this bitmap image may be 8 bits, 16 bits, or the like, for each color of R (Red) G (Green) B (Blue) as for each pixel. Further, the PDL and PS data may be, for example, transmitted from an external terminal, or the like, or stored in the document box of the storage unit 19.

The normal image data 210 is image data processed by various image processing by the normal image processing unit 100. The normal image data 210 may have similar resolution as the high-resolution data 202 as described later.

The analysis image data 220 is data output after the processing image data 200 is analyzed and image-processed by the analysis image processing unit 110. The analysis image data 220 may increase the resolution similar to that of the high-resolution data 202 as described later.

The processing image data 200 includes low-resolution data 201 and high-resolution data 202. In the present embodiment, they are stored in the storage unit 19 at a time when being read by the document reading unit 12.

The low-resolution data 201 is image data for analysis in the analysis image processing. The low-resolution data 201 may have a low resolution for printing, such as 100 dpi (dot per inch), but may have a sufficient resolution for analysis by AI, or the like. In addition, the low-resolution data 201 may be generated by lowering the resolution of the high-resolution data 202 by various algorithms such as averaging, or the like, by the hardware of the document reading unit 12, the image processing unit 11, the control unit 10, and the like.

The high-resolution data 202 is image data having a higher resolution than the low-resolution data 201. The high-resolution data 202 may have a resolution such as 300 to 1200 dpi, which is a resolution such that the roughness is not noticeable even if it is output by printing, or the like.

The print data 230 is output data generated from the processing image data 200. In the present embodiment, the print data 230 is a set of band data generated by color space conversion, or the like, in the image processing unit 11 for each page. The band data is the original data used when the image forming unit 17 forms an image. That is, the band data is a chunk of data, which is used for forming an electrostatic latent image on the photoconductor drum of each color. For example, when output in monochrome, the band data is monochrome bitmap data. On the other hand, when output in color, the band data becomes bitmap data of each color of CMYK.

Alternatively, the print data 230 may be various image data. The various image data include uncompressed bitmap images or compressed image data such as jpg, TIFF, PNG, jBIG, or the like. Alternatively, the print data 230 may be electronic document data such as PDL or PS where the merged image data is converted. Further, the print data 230 may be a structured document file of XML (Extensible Markup Language) or HTML (HyperText Markup Language). Alternatively, the print data 230 may be electronic book data such as ePUB, a plain text file (Plain Text) file, or the like. Alternatively, the print data 230 may be a file of various applications such as a word processor, spreadsheet software, presentation software, or the like. These print data 230 may be transmitted by e-mail, FTP, or the like, to a terminal such as another PC (Personal Computer), a server, a smartphone, or the like. Alternatively, the print data 230 may be image data used for facsimile transmission by the FAX transmitting/receiving unit 18.

Here, the control unit 10 of the image forming apparatus 1 is made to function as the normal image processing unit 100, the analysis image processing unit 110, and the merge processing unit 120 by executing a control program stored in the storage unit 19.

Further, a part or any combination of the above-mentioned functional configurations can be configured with the image processing unit 11. At this time, each function may be configured as a circuit by hardware such as IC, programmable logic, FPGA (Field—Programmable Gate Array), ASIC, and the like.

In addition, each part of the image forming apparatus 1 described above is a hardware resource for executing the image forming method of the present disclosure.

[Imaging Process for Printing by the Image Forming Apparatus 1]

Next, an imaging process for printing by the image forming apparatus 1 according to the embodiment of the present disclosure is described with reference to FIGS. 3 to 4.

In the print image processing of the present embodiment, the processing image data 200 for image-processing is acquired. Next, normal image processing is performed on the acquired processing image data 200, and normal image data 210 is output. Then, in parallel with the normal image processing, the analysis image processing is performed and the analysis image data 220 is output. Then, the output normal image data 210 and the output analysis image data 220 are merged to output the print data 230 for printing. Finally, the print data 230 is output by image formation, or the like.

In the imaging process for printing of the present embodiment, the control unit 10 mainly executes the program stored in the storage unit 19 in cooperation with each unit and uses the hardware resources. Further, the image processing unit 11 executes at least apart of the processing by using the hardware resources.

Hereinafter, the details of the imaging process for printing according to the present embodiment is described step by step with reference to the flowchart of FIG. 3.

(Step S101)

First, the document reading unit 12 performs an image acquisition process.

In the present embodiment, the user places the manuscript on the manuscript resting unit, and the user gives an instruction for copying by the operation panel unit 16. Then, the document reading unit 12 reads the document and stores the processing image data 200 in the storage unit 19. Here, the document reading unit 12 stores the processing image data 200 including the low-resolution data 201 and the high-resolution data 202 in the storage unit 19.

At the time of this reading, the user can also instruct the reading and/or output setting from the operation panel unit 16 or an external terminal. Of these, the reading setting includes a setting for monochrome printing and a setting for performing various image processing. The settings for performing the various image processing include the image processing settings included in the analysis image processing and/or the normal image processing. Furthermore, the reading settings include file format, color, single color, or black and white setting, resolution setting, or the like. Also, the output settings include monochrome print settings, transmission settings, and the like.

The settings of the image forming apparatus 1, and the like, may be reflected in the output settings. That is, for example, even though the user has set color printing, monochrome printing may be performed.

(Step S102)

Next, the analysis image processing unit 110 determines whether or not analysis processing is necessary. The analysis image processing unit 110 determines Yes if the above-mentioned reading setting and/or output setting includes a setting for performing analysis image processing. The analysis image processing unit 110 determines No if the setting for performing the analysis image processing is not included.

In the case of Yes, the analysis image processing unit 110 advances the processing to step S103.

In the case of No, the analysis image processing unit 110 proceeds to step S107.

(Step S103)

If the analysis image processing is required, the analysis image processing unit 110 performs the analysis process.

The analysis image processing unit 110 first analyzes the processing image data 200. In the present embodiment, the analysis image processing unit 110 may perform OCR when necessary for the analysis image processing. When emphasizing a color character, the analysis image processing unit 110 searches for an area of the color character. At this time, the analysis image processing unit 110 may calculate the color of the recognized character from the ratio between the R (Red) value, the G (Green) value, and the B (Blue) value, or the like, for the pixels of the character area. Alternatively, the color of the character can be calculated by using a block region of the character itself. Further, the analysis image processing unit 110 can use a specific threshold value to determine from the color of the character whether or not it is the set emphasized color and tag it. Alternatively, the analyzing image processing unit 110, if the keyword extraction is required, the set keyword may be searched from the character data obtained by OCR. Further, the analysis image processing unit 110 may perform image recognition on the low-resolution data 201 and tag the low-resolution data 201 when image recognition is required. The analysis image processing unit 110 may use an accelerator of AI, OCR, or the like, in the image processing unit 11 for processing these analyzes.

(Step S104)

Next, the analysis image processing unit 110 performs analysis image process.

The analysis image processing unit 110 generates the analysis image data 220 corresponding to the result of the above analysis processing and stores it in the storage unit 19.

Specifically, for example, when the analysis image processing unit 110 performs OCR, the analysis image processing unit 110 draws (renders) OCR-recognized characters on the analysis image data 220. At this time, the drawing may be performed according to the font, or the like, of the characters recognized by the OCR. Alternatively, when emphasizing the color characters, the analysis image processing unit 110 generates the analysis image data 220 in which the outline of the searched character area is thickened, or the outline is replaced and drawn with the bold characters. In addition, the analysis image processing unit 110 may also generate the analysis image data 220 drawn by replacing the keywords with the bold characters, or the like, when the keyword is extracted. Further, the analysis image processing unit 110 may include the above-mentioned OCR characters, color character areas, extracted keywords, and the like, in the analysis image data 220 as metadata, and the like.

On the other hand, when image recognition is performed, the analysis image processing unit 110 generates the analysis image data 220, which is added with an annotation of the recognition result around the part of the image, put in a form, or added by braille or barcode, or the like. For example, when the analysis image processing unit 110 recognizes a picture of a dog, it can draw the characters "dog" under the picture. Alternatively, the analysis image processing unit 110 can clarify the image of the analysis image data 220 by AI such as GAN (Generative Adversarial Network) or perform conversion processing. Further, the analysis image processing unit 110 can include the image recognition result in the analysis image data 220 as metadata, or the like.

(Step S105)

Here, the normal image processing unit 100 performs normal image process in parallel with steps S103 and S104 as described above.

The normal image processing unit 100 reads out the high-resolution data 202 of the processing image data 200 from the storage unit 19 and uses the image processing unit 11 to perform the normal image processing set in the output settings. Specifically, in the present embodiment, for example, the normal image processing unit 100 converts high-resolution data 202 of color into monochrome. Then, the normal image processing unit 100 outputs the normal image data 210 processed by this normal image processing to the storage unit 19.

Here, the analysis image processing unit 110 and the normal image processing unit 100 may be adjusted so that the analysis image data 220 and the normal image data 210 are output almost at the same time. Therefore, for example, the analysis image processing unit 110 and the normal image processing unit 100 may assign tasks, processes, threads, and the like, by adjusting the processing priority and processing time.

Figure 4:
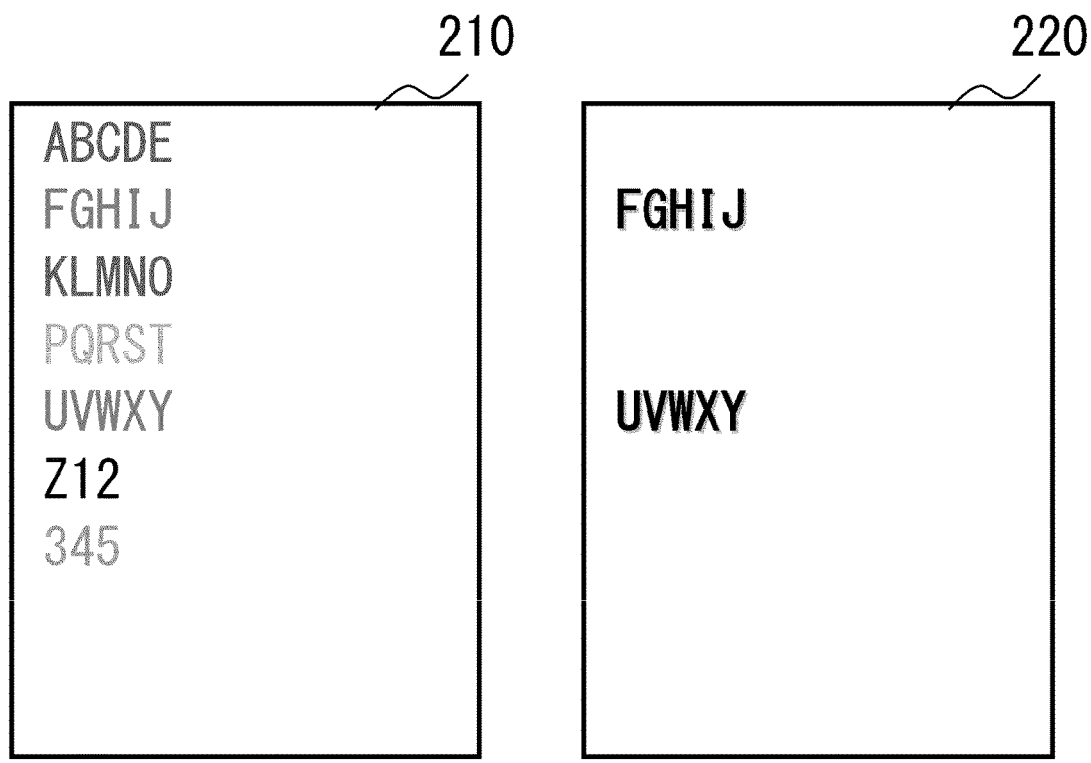
FIG. 4 is a conceptual diagram of the imaging process for printing shown in FIG. 3.
Figure 4:
Figure 4:
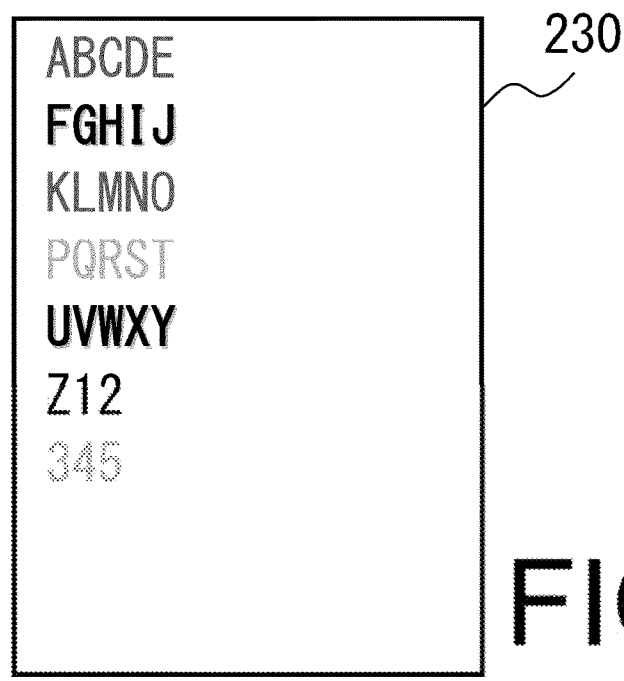

FIG. 4 shows an example that the analysis image data 220, which the set color characters are emphasized by color character emphasis, is generated. Further, an example is shown in which the normal image processing unit 100 generates normal image data 210 obtained by converting a color document into monochrome.

(Step S106)

Here, the merge processing unit 120 performs the merge process.

The merge processing unit 120 reads out the analysis image data 220 and the normal image data 210, and it performs a merge process by superimposing them. In the embodiment, this merge process is, for example, a process of averaging each pixel of the normal image data 210 and the analysis image data 220 or replacing each pixel with one having a large brightness or saturation. Of these, for averaging, when a pixel is a set color such as a background color, the pixel can be excluded. Further, at this time, when the analysis image data 220 has an area having a specific number of pixels ratio, the merge processing unit 120 can replace the pixels in the area of the normal image data 210. That is, the part of the character drawn by OCR in the analysis image data 220, the part of the emphasized character, the part of the image data that has been clarified or converted, or the like, may only be output to the print data 230. Alternatively, the merge processing unit 120 can perform a merge process by making the background brightness of the characters in the annotation of the analyzed image low and light so that it is easy to be recognized. These merge processes may be executed by hardware, which performs processing such as stamping, or the like, in the image processing unit 11.

The merge processing unit 120 outputs the print data 230 that has undergone this merge process to the storage unit 19.

FIG. 4 shows an example of the print data 230 merged by this merge process. The print data 230 shows an example in which the emphasized character area of the analysis image data 220 is replaced with the normal image data 210.

(Step S107)

If the setting for performing the analysis image processing is not included, the normal image processing unit 100 performs the normal image process.

This process is performed in the same manner as in step S105.

(Step S108)

Here, the image forming unit 17 performs the image forming process.

The image forming unit 17 forms an image of the print data 230, records the image on the recording paper, and discharges it from the discharge tray. At this time, the image forming unit 17 forms the image corresponding to the above-mentioned output setting. Therefore, for example, the image forming unit 17 may print a color document in monochrome, or the like.

Alternatively, the print data 230 may be converted into electronic document data and transmitted to an external terminal or server by e-mail, FTP, or the like, or may be facsimile transmitted by the FAX transmitting/receiving unit 18 for output.

As described above, the imaging process for printing according to the embodiment of the present disclosure is completed.

With the above configuration, the following effects can be obtained.

In a typical image processing apparatus, when a color document is printed in monochrome, the part represented in a specific color can be emphasized.

Here, when emphasizing a specific character, or the like, color character analysis processing, color character image processing (emphasis processing), and normal image processing other than color characters are necessary to be performed. However, in a typical technology, since normal image processing is performed after such image analysis and enhancement processing, it takes extra time for image analysis processing and enhancement processing as compared with normal printing. As a result, the printing performance is lower than that of normal monochrome printing.

Furthermore, in recent years, there has been an increase in demand for complex image analysis and image processing by AI in addition to character emphasis. However, since these processes take time, there is a concern that the printing performance may be deteriorated.

For this reason, in a typical apparatus, the analysis image processing cannot be set to be performed in default.

On the other hand, the image forming apparatus 1 according to the embodiment of the present disclosure includes an image acquisition unit that acquires processing image data 200 for image-processing; a normal image processing unit 100 that performs normal image processing for normal output on the processing image data 200 acquired by the image acquisition unit and outputs the normal image data 210; an analysis image processing unit 110 that performs analysis image processing accompanied by analysis and outputs analysis image data 220 in parallel with the normal image processing by the normal image processing unit 100; and a merge processing unit 120 that merges the normal image data 210 output by the normal image processing unit 100 and the analysis image data 220 output by the analysis image processing unit 110 and outputs print data 220 for printing.

As configured in this way, the performance of the processing can be improved by performing the analysis image processing in parallel with the normal image processing and merging it later. As a result, the improving performance is expected even in complicated image analysis, image processing, or the like, by AI. Therefore, the analysis image processing may be set to be executed by default.

Further, in the image forming apparatus 1 according to the embodiment of the present disclosure, the normal image processing includes monochrome image processing for converting the processing image data of color for monochrome printing, and the analysis image processing includes any of color character enhancement, optical character recognition, keyword extraction, and image recognition during monochrome printing.

As configured in this way, when analysis image processing is required during monochrome printing, normal image processing and analysis image processing are performed in parallel, and both image data are merged immediately before printing. This can improve performance. Otherwise, a decrease in performance by performing monochrome image processing after performing analysis image processing can be prevented.

Further, in the image forming apparatus 1 according to the embodiment of the present disclosure, the image acquisition unit acquires low-resolution data 201 and high-resolution data 202 having a higher resolution than the low-resolution data 201 as processing image data 200, and the analysis image processing unit 110 performs the analysis with the low-resolution data 201, and the normal image processing unit 100 performs the normal image processing based on the high-resolution data 202.

As configured in this way, at the time of analysis of the processing image data 200, the small low-resolution data 201 for analysis generated at the same time as the high-resolution data 202, which is the large scan data can be used. As a result, the low-resolution data 201 can be analyzed quickly. Thus, when the time-consuming analysis and the normal image processing are executed in parallel, the waiting time can be reduced and the performance can be improved.

Further, in the image forming apparatus 1 according to the embodiment of the present disclosure, when an area having a specific number of pixels ratio exists in the analysis image data 220, the merge processing unit 120 replaces the pixels in the area of the normal image data 210.

As configured in this way, when the merge process is performed, the image data by the analysis image processing can improve the visibility.

In the image forming apparatus 1 according to an embodiment of the present disclosure, the merge processing unit 120 performs the merge processing by hardware that performs any of stamping, form insertion, page number addition, and overlay.

With this configuration, processing can be performed without degrading print performance without installing new hardware. In addition, such hardware is more effective because it often uses high-speed hardware that does not easily reduce performance even when performing normal printing.

[Other Embodiments]

In the above-described embodiment, an example in which analysis image processing is performed using low-resolution data 201 has been described.

However, depending on the content of the processing, the analysis image processing by using the high-resolution data 202 may also be performed.

With this configuration, the quality of the analysis image data 220 can be improved, and also the accuracy of recognition by OCR or AI can be improved.

Further, in the above-described embodiment, an example in which the normal image data 210 and the analysis image data 220 have the same resolution is described. That is, in the example, the analysis image data 220 is subjected to processing such as enlargement of the low-resolution data 201 to obtain the same resolution. This makes it possible to improve the performance of the merge process.

However, the normal image data 210 and the analysis image data 220 may be different resolutions. In this case, the print data 230 can be generated by matching the resolutions in the merge process. In addition, when adjusting the resolution, by averaging the edge portions, and the like, the edge portions can be inconspicuous.

With this configuration, various configurations of the merge process can be supported.

Further, the analysis image data 220 may be configured to be the background color or transparency except for the pixels being output. Further, the analysis image data 220 may be converted into a format similar to the image data for forms and watermarks.

Alternatively, either the normal image data 210 or the analysis image data 220 may be configured to be compressed for the background color, or the like.

As configured in this way, flexible configurations can be supported, and processing can match the hardware configuration. Further, by performing compression, or the like, shortage of the storage capacity of the storage unit 19 can be suppressed.

Further, the present disclosure can be applied to an image processing apparatus other than the image forming apparatus. For example, a network scanner, a server to which the scanner is separately connected by USB, or the like, may be used. Alternatively, a configuration that the processing image data 200 acquired by a network scanner, or the like, the processing image data 200 created by the terminal, or the like, is transmitted to the image forming apparatus 1 for processing can be supported.

Further, a part of the analysis image processing according to the present embodiment can be executed with an AI accelerator connected by USB (Universal Serial Bus), a GPU, or the like. Furthermore, the analysis image processing can be executed on a server, a user's terminal, or the like, via a network.

As configured in this way, performance can be further improved.

It is needless to say that the configuration and operation of the above-mentioned embodiment are just an example, it can be appropriately modified and performed without departing from the aim of the present disclosure.

EXPLANATION OF SYMBOLS

Figure 3:
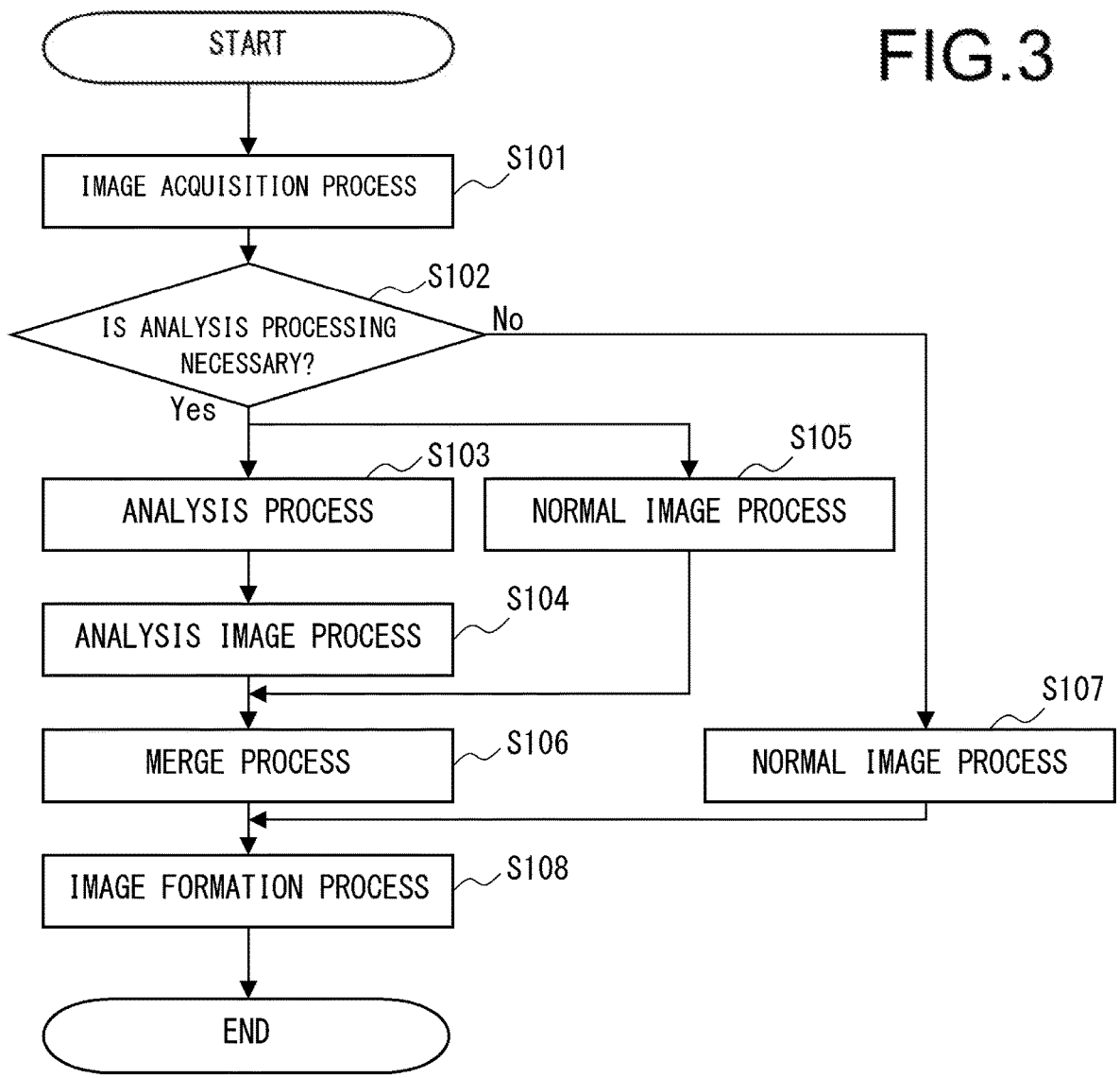
FIG. 3 is a flowchart of imaging process for printing according to the embodiment of the present disclosure.

1 IMAGE FORMING APPARATUS
10 CONTROL UNIT
11 IMAGE PROCESSING UNIT
12 DOCUMENT READING UNIT
13 DOCUMENT FEEDING UNIT
14 PAPER FEEDING UNIT
15 NETWORK TRANSMITTING/RECEIVING UNIT
16 OPERATION PANEL UNIT
17 IMAGE FORMING UNIT
18 FAX TRANSMITTING/RECEIVING UNIT
19 STORAGE UNIT
100 NORMAL IMAGE PROCESSING UNIT
110 ANALYSIS IMAGE PROCESSING UNIT
120 MERGE PROCESSING UNIT
200 PROCESSING IMAGE DATA
201 LOW-RESOLUTION DATA
202 HIGH-RESOLUTION DATA
210 NORMAL IMAGE DATA
220 ANALYSIS IMAGE DATA
230 PRINT DATA
FIG. 3:
START
S101: IMAGE ACQUISITION PROCESS
S102: IS ANALYSIS PROCESSING NECESSARY?
S103: ANALYSIS PROCESS
S104: ANALYSIS IMAGE PROCESS
S105: NORMAL IMAGE PROCESS
S106: MERGE PROCESS
S107: NORMAL IMAGE PROCESS
S108: IMAGE FORMATION PROCESS
END

What is claimed is:

1. An image processing apparatus comprising:
an image acquisition unit configured to acquire processing image data for image-processing;
a normal image processing unit configured to perform normal image processing for normal output on the processing image data acquired by the image acquisition unit and to output normal image data;
an analysis image processing unit configured to perform analysis image processing accompanied by analysis and to output analysis image data in parallel with the normal image processing performed by the normal image processing unit; and
a merge processing unit configured to merge the normal image data output by the normal image processing unit and the analysis image data output by the analysis image processing unit and to output print data for printing; wherein
the image acquisition unit acquires low-resolution data and high-resolution data having a higher resolution than the low-resolution data as the processing image data,
the analysis image processing unit performs the analysis with the low-resolution data, and
the normal image processing unit performs the normal image processing based on the high-resolution data.

2. The image processing apparatus according to claim 1, wherein
the normal image processing includes monochrome image processing for converting the processing image data of color data to the processing image data for monochrome printing, and
the analysis image processing includes any of color character enhancement, optical character recognition, keyword extraction, and image recognition during monochrome printing.

3. The image processing apparatus according to claim 1, wherein the merge processing unit performs the merge processing by hardware that performs any of stamping, form insertion, page number addition, and overlay.

4. The image processing apparatus according to claim 1, wherein when there is an area having a specific number of pixels ratio in the analysis image data, the merge processing unit replaces the pixels in the area of the normal image data.

5. An image processing apparatus comprising:
an image acquisition unit configured to acquire processing image data for image-processing;
a normal image processing unit configured to perform normal image processing for normal output on the processing image data acquired by the image acquisition unit and to output normal image data;
an analysis image processing unit configured to perform analysis image processing accompanied by analysis and to output analysis image data in parallel with the normal image processing performed by the normal image processing unit; and
a merge processing unit configured to merge the normal image data output by the normal image processing unit and the analysis image data output by the analysis image processing unit and to output print data for printing; wherein
when there is an area having a specific number of pixels ratio in the analysis image data, the merge processing unit replaces the pixels in the area of the normal image data.

6. The image processing apparatus according to claim 5, wherein
the image acquisition unit acquires low-resolution data and high-resolution data having a higher resolution than the low-resolution data as the processing image data,
the analysis image processing unit performs the analysis with the low-resolution data, and
the normal image processing unit performs the normal image processing based on the high-resolution data.

7. The image processing apparatus according to claim 5, wherein
the normal image processing includes monochrome image processing for converting the processing image data of color data to the processing image data for monochrome printing, and
the analysis image processing includes any of color character enhancement, optical character recognition, keyword extraction, and image recognition during monochrome printing.

8. The image processing apparatus according to claim 5, wherein the merge processing unit performs the merge processing by hardware that performs any of stamping, form insertion, page number addition, and overlay.

9. An image forming apparatus comprising:
an image acquisition unit configured to acquire processing image data for image-processing;
a normal image processing unit configured to perform normal image processing for normal output on the processing image data acquired by the image acquisition unit and to output normal image data;
an analysis image processing unit configured to perform analysis image processing accompanied by analysis and to output analysis image data in parallel with the normal image processing performed by the normal image processing unit;
a merge processing unit configured to merge the normal image data output by the normal image processing unit and the analysis image data output by the analysis image processing unit and to output print data for printing; and
an image forming unit configured to form an image of the print data that has been merged by the merge processing unit; wherein
the image acquisition unit acquires low-resolution data and high-resolution data having a higher resolution than the low-resolution data as the processing image data,
the analysis image processing unit performs the analysis with the low-resolution data, and
the normal image processing unit performs the normal image processing based on the high-resolution data.

10. The image forming apparatus according to claim 9, wherein
the normal image processing includes monochrome image processing for converting the processing image data of color data to the processing image data for monochrome printing, and
the analysis image processing includes any of color character enhancement, optical character recognition, keyword extraction, and image recognition during monochrome printing.

11. The image forming apparatus according to claim 9, wherein
the merge processing unit performs the merge processing by hardware that performs any of stamping, form insertion, page number addition, and overlay.

12. The image forming apparatus according to claim 9, wherein
when there is an area having a specific number of pixels ratio in the analysis image data, the merge processing unit replaces the pixels in the area of the normal image data.

13. An image forming apparatus comprising:
an image acquisition unit configured to acquire processing image data for image-processing;
a normal image processing unit configured to perform normal image processing for normal output on the processing image data acquired by the image acquisition unit and to output normal image data;
an analysis image processing unit configured to perform analysis image processing accompanied by analysis and to output analysis image data in parallel with the normal image processing performed by the normal image processing unit;
a merge processing unit configured to merge the normal image data output by the normal image processing unit and the analysis image data output by the analysis image processing unit and to output print data for printing; and
an image forming unit configured to form an image of the print data that has been merged by the merge processing unit, wherein
when there is an area having a specific number of pixels ratio in the analysis image data, the merge processing unit replaces the pixels in the area of the normal image data.

14. The image forming apparatus according to claim 13, wherein
the image acquisition unit acquires low-resolution data and high-resolution data having a higher resolution than the low-resolution data as the processing image data,
the analysis image processing unit performs the analysis with the low-resolution data, and
the normal image processing unit performs the normal image processing based on the high-resolution data.

15. The image forming apparatus according to claim 13, wherein
the normal image processing includes monochrome image processing for converting the processing image data of color data to the processing image data for monochrome printing, and
the analysis image processing includes any of color character enhancement, optical character recognition, keyword extraction, and image recognition during monochrome printing.

16. The image forming apparatus according to claim 13, wherein
the merge processing unit performs the merge processing by hardware that performs any of stamping, form insertion, page number addition, and overlay.

* * * * *